United States Patent
Moskowitz

[11] Patent Number: 6,163,250
[45] Date of Patent: Dec. 19, 2000

[54] SYSTEM AND METHOD FOR SENSING OBJECTS ON SURFACE OF VEHICLE

[75] Inventor: Paul Andrew Moskowitz, Yorktown Heights, N.Y.

[73] Assignee: International Business Machines Corporation, Armonk, N.Y.

[21] Appl. No.: 09/386,161

[22] Filed: Aug. 31, 1999

[51] Int. Cl.[7] ....................................................... B60Q 1/00
[52] U.S. Cl. ........................ 340/425.5; 340/436; 340/457; 340/568.1; 340/666; 340/686.1; 116/28 R
[58] Field of Search ................................. 340/425.5, 436, 340/438, 457, 568.1, 665, 666, 686.1; 116/28 R

[56] References Cited

U.S. PATENT DOCUMENTS

| | | |
|---|---|---|
| 4,128,005 | 12/1978 | Arnston et al. . |
| 4,827,520 | 5/1989 | Zeinstra . |
| 4,866,515 | 9/1989 | Tagawa et al. . |
| 5,041,976 | 8/1991 | Marko et al. . |
| 5,107,428 | 4/1992 | Bethencourt et al. . |
| 5,150,609 | 9/1992 | Ebner et al. . |
| 5,313,388 | 5/1994 | Cortis . |
| 5,333,177 | 7/1994 | Braitberg et al. . |
| 5,400,018 | 3/1995 | Scholl et al. . |
| 5,442,553 | 8/1995 | Parrillo . |
| 5,442,633 | 8/1995 | Perkins et al. . |
| 5,479,479 | 12/1995 | Braitberg et al. . |
| 5,652,911 | 7/1997 | Van Venrooy et al. . |
| 5,732,074 | 3/1998 | Spaur et al. . |
| 5,758,300 | 5/1998 | Abe . |
| 5,794,164 | 8/1998 | Beckert et al. . |
| 5,805,079 | 9/1998 | Lemelson . |
| 5,809,437 | 9/1998 | Breed . |
| 5,815,071 | 9/1998 | Doyle . |

*Primary Examiner*—Edward Lefkowitz
*Attorney, Agent, or Firm*—McGinn & Gibb, P.C.; Stephen C. Kaufman, Esq.

[57] ABSTRACT

A system for detecting an object located on a surface of a vehicle, includes a sensor for sensing whether an object is located on a surface of a vehicle, a warning indicator for emitting a warning based on an output of the sensor, and a device for transmitting a signal from the sensor to the warning indicator.

20 Claims, 2 Drawing Sheets

SYSTEM AND METHOD FOR SENSING OBJECTS ON SURFACE OF VEHICLE

BACKGROUND OF THE INVENTION

1. Field of the Invention

The present invention generally relates to a vehicle, and more particularly to a vehicle including a device for sensing an object on the outside surface of the vehicle.

2. Description of the Related Art

Typically, vehicle drivers and/or passengers place objects on, for example, the roof or hood of their vehicle. Oftentimes, the driver and/or passengers forget that they have placed the objects there, and proceed to enter the car and drive away. The objects are usually grocery or food items, or beverages such as coffee or soft drinks, etc., but may include other items. Indeed, in one reported case, a baby was placed on the top of a vehicle and the vehicle driver drove away without knowing the baby was on the roof of the vehicle. The results of this sequence of events ranges from the comic to the tragic.

Although the above-described phenomena is widespread, hitherto the present invention, there has been no recognition that this is a technical problem that may have a technical solution. While automobiles have been manufactured with systems to warn of open doors, keys in the ignition, lights being left on, etc., it is assumed that it is the fault of the driver if the driver leaves groceries or the like on the vehicle roof or other external surface of the vehicle.

Moreover, systems have been devised to employ sensors coupled to safety warning indicators to warn of the presence of individuals adjacent to or in contact with the bumpers of vehicles. However, the detection and warning of objects on the horizontal surfaces of vehicles has not been addressed.

SUMMARY OF THE INVENTION

In view of the foregoing and other problems of the conventional methods and structures, an object of the present invention is to provide a system and method in which objects placed on the surface of (e.g., on top of and in contact with a vehicle roof, hood, trunk etc.) a vehicle are reliably sensed, such that preventive measures can be taken by the driver.

In a first aspect of the present invention, a system for detecting objects located adjacent or on a surface (e.g., top surface) of a vehicle includes a sensor, a warning indicator for emitting a warning based on an output of the sensor, and a device for transmitting a signal from the sensor to the warning indicator.

With the unique and unobvious features of the invention, objects adjacent or on the surface of a vehicle (e.g., on the vehicle hood, roof or trunk) can be reliably sensed and preventive measures may be taken by the driver and/or passenger. (It is understood that "object on the surface of the vehicle" describes an object which is held by gravity and friction in contact with any horizontal or close-to-horizontal surface which can retain an object held by a combination of gravity and friction. Among such surfaces may be the vehicle roof, hood, trunk, spoiler, front or rear bumper, etc.) As a result, the objects can be detected, and removed from the external surface of the vehicle, without harm to the object or to the vehicle occurring. The system will also detect an accumulation of snow or ice on the surfaces of the vehicle. Such accumulations are a safety concern as they can become dislodged while the vehicle is being driven and, as a result, obscure the vision of the driver of the vehicle or the drivers of following vehicles or cause damage to following vehicles.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
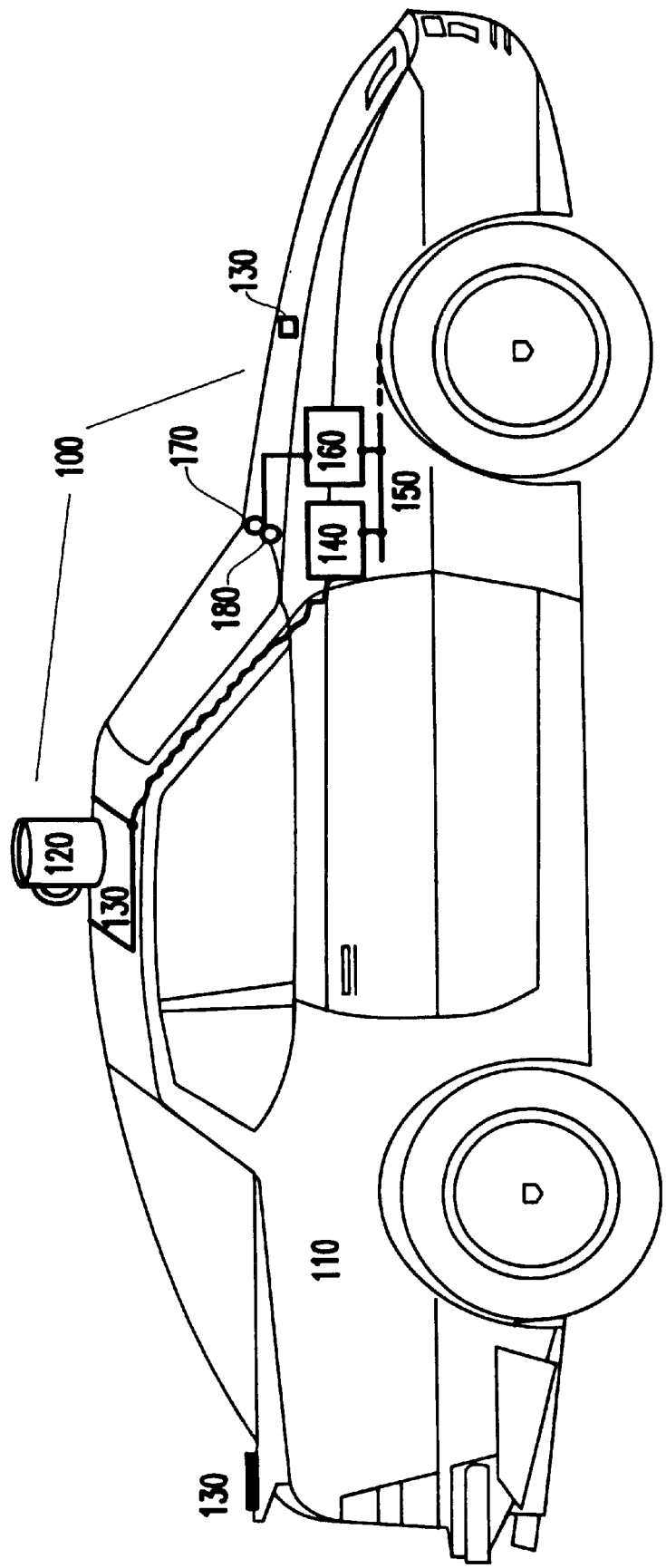
FIG. 1 is a schematic diagram of a vehicle including an object positioned thereon for being sensed according to a first preferred embodiment of a system of the present invention.
Figure 2:
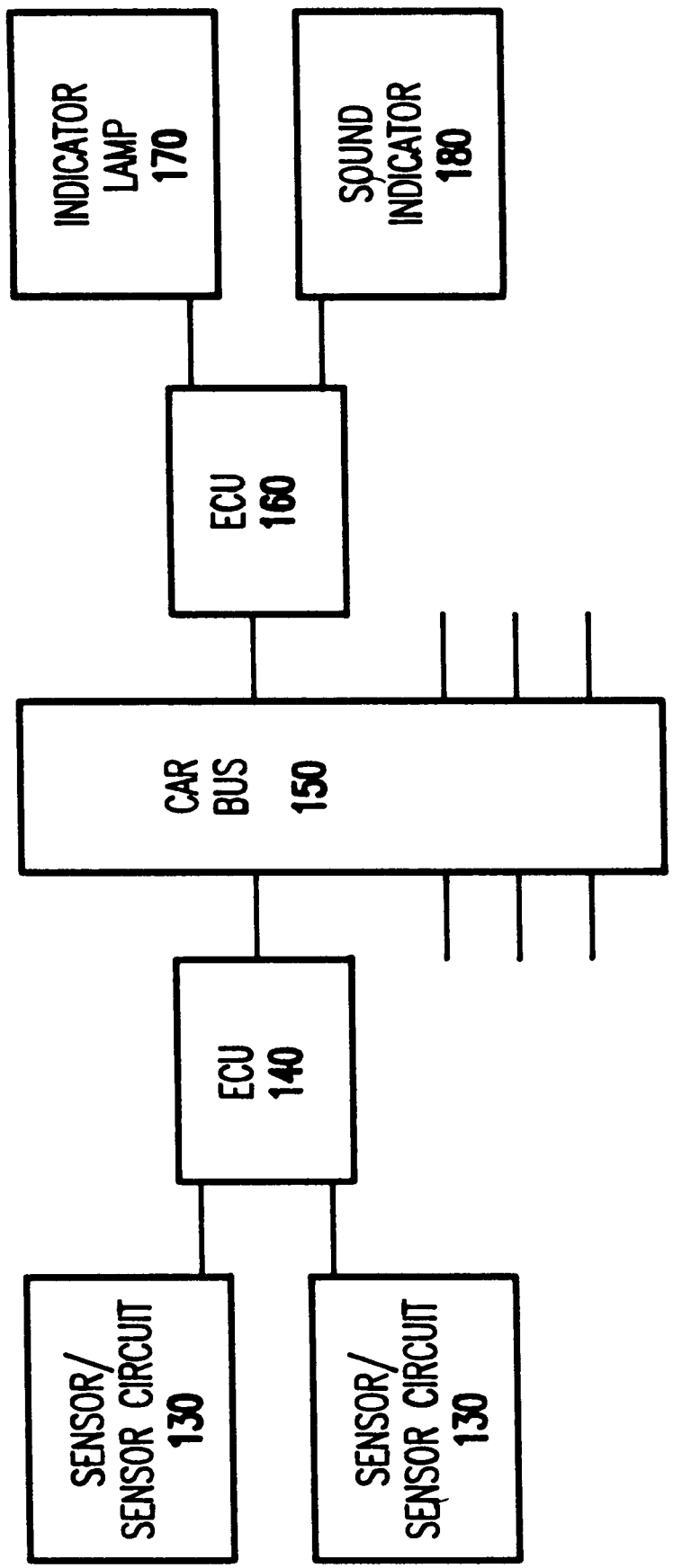
FIG. 2 is a block diagram of components of the inventive system according to the present invention.

Referring now to the drawings, and more particularly to FIGS. 1–2, there is shown a preferred embodiment of the system according to the present invention.

Generally, the solution to the above and other problems of the conventional systems is a system which detects objects placed upon the vehicle and warns the driver of the presence of such objects.

Referring to FIG. 1, a vehicle system 100 is shown for use with a vehicle 1 10 and including an object 120 placed thereon (e.g., in the case at hand, the object is a coffee mug 120 placed on the surface of the vehicle roof, but of course the invention is useful for sensing any animate or inanimate object placed inadvertently on the surface of the vehicle), at least one sensor (or sensor circuit) and more preferably a plurality of sensors 130 located at different positions of the exterior of the vehicle, an electronic control unit (ECU) 140, a vehicle communication bus 150 for carrying data and control signals to the ECU 140, an ECU 160 interfaced with the bus 150, at least one sensing indicator 170, 180 (and more preferably a plurality of sensing indicators 170, 180) including, for example, a visual warning or indicator lamp, sound alarm, etc.). In a simpler implementation, the sensor (or sensor circuit) 130 may be connected directly to a sensing indicator 170 (lamp) or 180 (sound indicator) without making use of the vehicle communications bus. However, vehicles are being manufactured with increasing numbers of functions being controlled through the use of the vehicle communications bus. For example, virtually all vehicle functions are controlled through the vehicle bus for a Cadillac Seville STS.

In its simplest embodiment, the inventive system and method for detecting objects located on a surface (e.g., top surface) of a vehicle includes the sensor, the warning indicator for emitting a warning based on an output of the sensor, and a device for transmitting a signal from the sensor to a warning indicator (e.g., lamp 170, or sound indicator 180).

Turning to FIG. 2, a preferred embodiment is described hereinbelow

The system 100 includes a sensor 130 which detects an object 120 located on the outside of the vehicle 110. The sensor can be formed of known and commercially available components such as a force or pressure gauge attached to the inside of the vehicle roof (e.g., see FIG. 1). Many types of sensors may be employed including any one or more of capacitive and/or force/pressure sensors and are known in the art. Such sensor components and configurations are described in, for example, U.S. Pat. No. 4,300,116, U.S. Pat. No. 5,402,075, U.S. Pat. No. 5,313,189, U.S. Pat. No. 5,629,488, U.S. Pat. No. 5,871,063, U.S. Pat. No. 5,297,430, U.S. Pat. No. 5,305,644, U.S. Pat. No. 5,857,536, U.S. Pat.

No. 5,654,615, U.S. Reissue Pat. No. 034,773, and U.S. Pat. No. 5,602,526, each incorporated herein by reference.

The presence of an object on the outside vehicle surface (e.g., hereinafter assumed to be the top of the roof, but of course any area may be monitored) causes a change in the electrical characteristics of the sensor 130.

The sensor's electrical characteristics are monitored by the electronic control unit (ECU) 140, which responds to a change by reporting, for example, a diagnostic trouble code (DTC) over the car bus, such as a Society of Automotive Engineers (SAE) J1850 communications bus, or a Controller Area Network (CAN) bus. The bus conveys the DTC to a second ECU 160 which controls an indicator 170, and/or 180. As mentioned above, the indicator may provide a visual or audible warning. Such systems are used in automobiles today to indicate that a door has not been closed, that the car lights have been left on after the ignition is turned off, etc.

In addition to warning of objects inadvertently left on the car roof such as groceries, articles of clothing, wallets, purses, beverage containers such as coffee cups, the gas tank cap, babies, pets, etc., the system can be used to indicate an accumulation of snow or ice.

The present invention also can be advantageously used to detect precipitation. However, for the detection of objects as described herein, the sensitivity of the sensor would be set to ignore small objects such as rain drops, snow flakes, etc.

While the invention has been described in terms of a preferred embodiment, those skilled in the art will recognize that the invention can be practiced with modification within the spirit and scope of the appended claims.

What is claimed is:

1. system for detecting an object located on a surface of a vehicle, comprising:
   at least one sensor for sensing whether an object is located on a surface of a vehicle;
   a warning indicator for emitting a warning based on an output of said at least one sensor; and
   a device for transmitting a signal from said at least one sensor to said warning indicator.

2. The system according to claim 1, wherein a plurality of said at least one sensor are provided at predetermined positions on said vehicle.

3. The system according to claim 1, wherein said transmitting device comprises an electronic control unit (ECU) for processing signals from said at least sensor.

4. The system according to claim 3, wherein said transmitting device further comprises a vehicle communication bus for carrying data and control signals to said electronic control unit.

5. The system according to claim 4, wherein said transmitting device further comprises a second electronic control unit (ECU) interfaced with said bus.

6. The system according to claim 5, wherein said warning indicator is interfaced with said second electronic control unit (ECU).

7. The system according to claim 1, wherein said warning indicator comprises at least one of a visual indicator and an audible indicator.

8. The system according to claim 1, wherein said surface includes an external surface of the vehicle, and
   wherein a presence of an object on the external surface of the vehicle causes a change in electrical characteristics of said at least one sensor.

9. The system according to claim 1, wherein said transmitting device comprises a first electronic control unit (ECU) for processing signals from said at least one sensor, a communication bus interfaced with said electrical control unit, and a second electronic control unit interfaced with said bus,
   wherein the electrical characteristics of said at least one sensor are monitored by said first electrical control unit, which responds to a change by sending a signal over the bus, and
   wherein said second electronic control unit receives said signal over the bus and controls a warning indicator.

10. The system according to claim 9, wherein said bus comprises one of a Society of Automotive Engineers (SAE) J1850 bus and a Controller Area Network bus.

11. The system according to claim 1, wherein said object comprises at least one of a beverage container, a bag of groceries, a food item, a gas tank cap, a set of keys, an article of clothing, a wallet, a purse, a pet, and a baby.

12. The system according to claim 1, wherein said object comprises at least one of an accumulation of snow and an accumulation of ice.

13. The system according to claim 1, wherein said surface comprises one of a horizontal and a substantially horizontal surface.

14. The system according to claim 1, wherein said surface comprises at least one of a vehicle roof, a hood, a turn, a spoiler, a front bumper, and a rear bumper.

15. The system according to claim 1, wherein said at least one sensor comprises one of a capacitance sensor and a force/pressure sensor.

16. A hazard prevention system for a vehicle, comprising:
    at least one sensor for sensing whether an object is located on a surface of a vehicle;
    a warning indicator for emitting a warning based on an output of said at least one sensor; and
    a device for transmitting a signal from said at least one sensor to said warning indicator.

17. The system according to claim 16, wherein a plurality of said at least one sensor are provided at predetermined positions on said vehicle.

18. The system according to claim 16, wherein said transmitting device comprises an electronic control unit (ECU) for processing signals from said at least sensor.

19. The system according to claim 18, wherein said transmitting device further comprises a vehicle communication bus for carrying data and control signals to said electronic control unit.

20. The system according to claim 19, wherein said transmitting device further comprises a second electronic control unit (ECU) interfaced with said bus,
    wherein said warning indicator comprises at least one of a visual indicator and an audible indicator, and wherein said at least one sensor comprises one of a capacitance sensor and a force/pressure sensor.

* * * * *